United States Patent [19]

Campbell, Jr.

[11] 4,275,771
[45] Jun. 30, 1981

[54] INTERLOCKING TRUNCATED TRIANGULAR INSULATOR

[76] Inventor: Frank Campbell, Jr., 2274 Broadlawn Dr., Houston, Tex. 77058

[21] Appl. No.: 94,611

[22] Filed: Nov. 15, 1979

[51] Int. Cl.$^3$ ............................ F27D 9/00; F27D 3/02
[52] U.S. Cl. .................................... 138/149; 138/111; 138/155; 432/234
[58] Field of Search ............... 138/111, 115, 147, 149, 138/155; 432/233, 234, 235

[56] References Cited

U.S. PATENT DOCUMENTS

| 2,235,771 | 3/1941 | McDermott | 432/234 X |
| 3,572,662 | 3/1971 | Weaver | 138/155 X |
| 3,881,864 | 5/1975 | Nicol | 138/149 X |
| 4,228,826 | 10/1980 | Campbell | 138/149 |

FOREIGN PATENT DOCUMENTS

| 1075052 | 2/1960 | Fed. Rep. of Germany | 138/149 |
| 2505130 | 8/1976 | Fed. Rep. of Germany | 432/234 |
| 2558116 | 7/1977 | Fed. Rep. of Germany | 432/234 |

Primary Examiner—James E. Bryant, III
Attorney, Agent, or Firm—Fulbright & Jaworski

[57] ABSTRACT

A two-piece, interlocking insulator suitable for covering a truncated triangular pipe, the conforming insulator having a base unit, a pair of side walls convergingly extending from the ends of the base unit and terminating with an apex unit. The insulator can closely conform to the perimeter of the truncated triangular pipe of, as in another embodiment, to a ceramic fiber blanket located around the perimeter of the pipe. Each segment of the insulator has a body and a pair of spaced apart arms. When the two segments are longitudinally and conformingly aligned around the pipe, they can be urged together to form an interlocking, insulator which remains around the pipe without any other structural support.

When two truncated triangular pipes are aligned so that their base members are contiguous, an additional embodiment of the insulator includes a pair of segments each having a double-angle side wall, a pair of arms partially integral with and partially spaced apart from the double side wall by corresponding recesses and a void corresponding to the remaining double side wall so that as the two segments are conformingly aligned around the pair of pipes, they can be urged together to form an insulator covering.

The insulator can further be used with a truncated triangular pipe having a pair of shoulders extending outwardly from each side of the apex member and having a ceramic fiber blanket located around both side members and the base member of the pipe.

9 Claims, 6 Drawing Figures

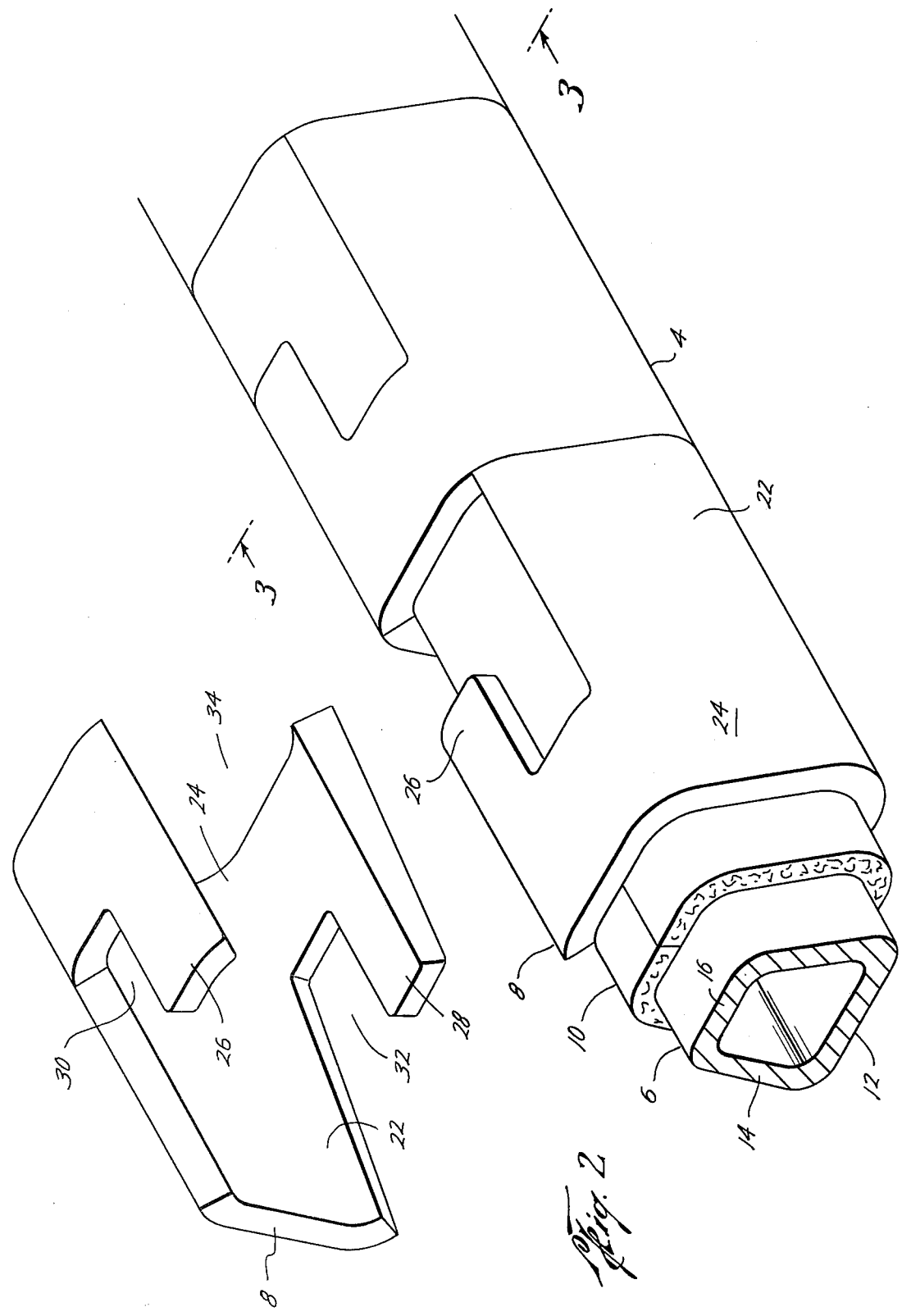

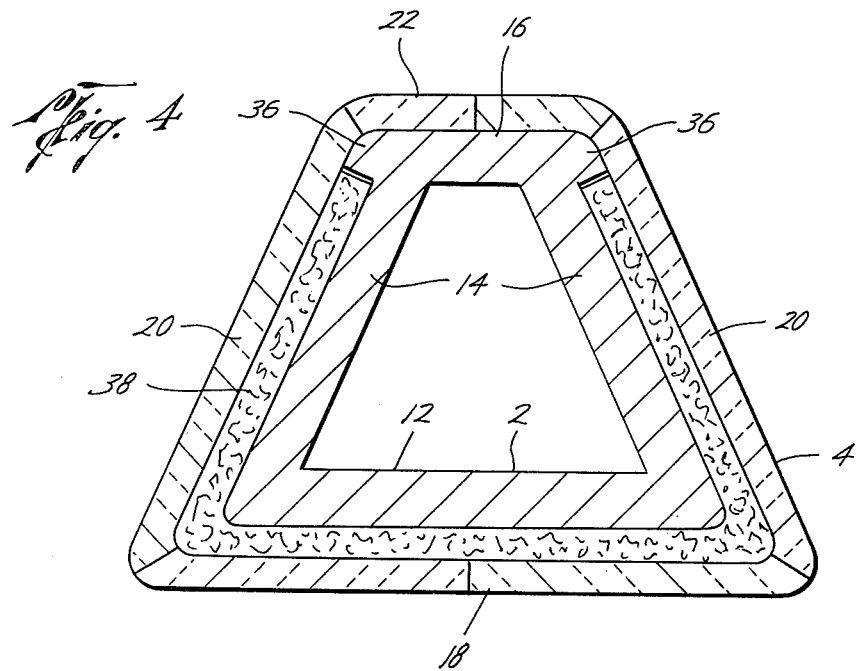
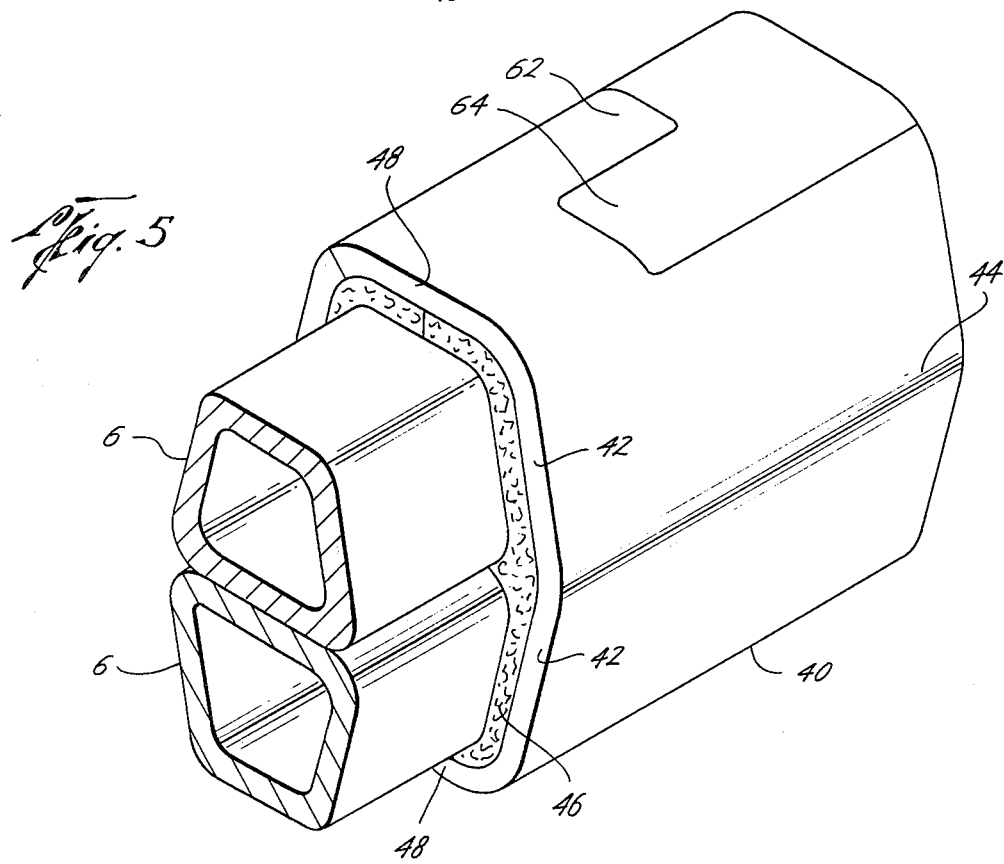

INTERLOCKING TRUNCATED TRIANGULAR INSULATOR

BACKGROUND OF THE INVENTION

In furnaces used throughout the metallurgical and related industries to heat a slab, billet, bloom or other raw steel shape, a typical furnace includes a complex network of vertical and horizontal water-cooled pipes which support an additional network of horizontal water-cooled skid rails along which the slabs, billets, blooms, or other raw steel shapes are pushed or walked through the furnace. The metallurgical furnace is an open system; that is, heat which is transferred to the metal pipe network is conducted by the flowing water in the pipes to a point outside the furnace and is not recoverable. Accordingly, vast amounts of heat losses occur and correspondingly unnecessary amounts of energy are expended to replace the heat loss as a result of the heat transfer into the water-cooled pipe network. For example, as much as thirty to thirty-five percent of the total heat supplied to a metallurgical furnace by the combustion of fuels is lost in an infrastructure of uninsulated skid pipes and the supporting pipe network. Hence, the more effective the insulator or refractory around the pipe network, the more efficient and the more economical is the furnace to operate.

To date, various types of refractory materials have been utilized in order to reduce the amount of heat loss from the furnace through the water-cooled pipe infrastructure. The use of pre-fired or chemically bonded refractory materials which are welded, studded, wired, clipped or anchored with interlocking anchor straps is well known. The use of welds, studs, wires and the like requires large expenditures of labor and time to strip the pipe and secure an additional refractory as a replacement. Moreover, refractory concretes have even been formed in place around the pipe surfaces which are supported by any number and type of metallic anchors welded to the pipe surface. Almost without exception these forms of insulation have failed within a relatively short period of operation because of the inherent friability and susceptibility to fracture of the heavy, brittle fired ceramic refractory materials. As the metallic shape is moved along the metal skid rail, significant vibration and flexion of the water-cooled pipe infrastructure occur which are in turn transmitted into the insulators. Consequently, the high temperature of the furnace and the flexion and vibrations within the pipe causes failure of the welded mesh and welded studs which support the insulator, thereby causing early failure of the insulator which falls to the furnace floor.

STATEMENT OF THE PRIOR ART

The following statement of the prior art is filed pursuant to 37 C.F.R. 1.97 and 1.98 and represents the most pertinent prior art of which the applicant is aware. In accordance with 37 C.F.R. 1.98(b), photocopies of the patents mentioned below are appended hereto.

| U.S. Pat. No. | Name |
|---|---|
| 3,941,160 | Cambell |
| 3,451,661 | Barker |
| 4,015,636 | Van Fossen |
| 3,754,948 | Ash |

The device in the '160 patent relates to a dense, preburned ceramic refractory formed in interlocking shapes which are positioned and held in place by a number of studs 35 welded to the pipe. A ceramic blanket is positioned between the water pipe and the preburned ceramic tile. The device in the '160 patent weighs approximately 35 to 40 pounds per lineal foot and is rigid. Hence, vibrations in the furnace are transmitted through the studs to the preburned ceramic tile and frequently induce fracture along the interlocking portions. The massive weight of the preburned ceramic tile also induces the fracture of the studs which support the refractory. The inventor of the '160 device is also the applicant herein.

The device in the '661 patent involves an interlocking outer refractory layer unsupported by studs welded to the pipe. The amount of time and labor expended in interlocking the numerous outer pieces is significant as is the number of seams defined by the individual pieces.

The '636 device again uses a preburned ceramic tile material having an inner layer of semi-cylindrical tiles held together on the pipe by a "C"-shaped ceramic refractory collar which is slid over the split tiles as they are held together. Again, the labor and time expended in insulating the pipe is less than satisfactory. The rigidity and weight of the device permits the transmission of vibrations and flexion of the pipe to the refractory which causes fracture of the refractory and deformation and wear of the insulating blanket underneath the tiles.

The '948 patent relates to a refractory composition comprising a mixture of mineral wool and ceramic fiber, without regard to a particular shape of any refractory. As noted in the patent itself, mineral wools operate in a relatively low temperature range, above which temperature shrinkage becomes unacceptable. The '948 patent itself explains that when temperatures in excess of 1,562° F. (850° centigrade) are encountered, the mineral wool must be replaced with a ceramic fiber. Hence, because temperatures of 2,400°–2,500° F. are frequently encountered in a metallurgical furnace, the use of a mineral wool-ceramic fiber admixture as an outer refractory is undesirable.

SUMMARY OF THE PRESENT INVENTION

The present invention is an insulator including two identical segments which can be fitted together around a truncated triangular pipe to form an insulator covering for the pipe. Because a truncated triangular pipe has a section modulus superior to a comparable cylindrical pipe, future furnaces will more frequently utilize a truncated triangular pipe and hence, a suitable refractory therefor is required. The insulated truncated triangular pipe permits fewer crosspipes in the furnace in order to support equivalent loads thereby reducing the amount of pipe exposed in the furnace which clearly reduces the energy loss through the pipe network.

For a truncated triangular water-cooled pipe simply having a base member, a pair of converging side members and an apex member, the two-segment insulator, when in place around the pipe, has a base unit, a pair of converging side walls and an apex unit which closely conform to the perimeter of the pipe. The configuration can further include a thermal blanket between the pipe and the insulator. Each segment of the insulator is identical with the other and includes a primary member which covers a portion of the apex unit, side wall and base unit. A body member longitudinally extends from the primary member to complete one side wall, and a pair of arms, which project from the primary member to form a portion of the apex and base units, extend less than the body member and are spaced apart therefrom by a corresponding pair of recesses. A void circumferentially separates the arms from one another, the void corresponding to the remaining side wall. Hence, when the two interlocking and conforming segments are properly aligned around the pipe or the thermal blanket, when they are urged together, the resulting insulator effectively covers that portion of the pipe.

Where the base members of two pipes are contiguous or proximate to one another and are longitudinally aligned, the insulator includes a pair of apex units each having a pair of side walls divergingly extending therefrom which are connected to the opposing diverging side walls when in place around the pipes. A six-sided insulator results having a pair of apexes connected to each other by a pair of spaced apart, double-angle walls. Each segment of the embodiment includes a double-angle side wall, a pair of longitudinally aligned arms which are partially integral with the double-angle side wall and are partially spaced apart circumferentially on either side of the double angle side wall by corresponding recesses. The arms themselves are spaced apart from one another by a void which corresponds to the remaining double-angle wall. Hence, when the two segments are properly aligned around the pair of pipes, and are urged toward another, the two segments are conformingly interlocked to form an insulator around a portion of the pipes. Again, a ceramic fiber blanket or thermal blanket can be disposed between the perimeter of the pipes and the insulator.

The single pipe insulator can also be utilized with a truncated triangular pipe having a pair of shoulders extending outwardly from either side of the apex member. In this embodiment, a thermal blanket is located between the insulator and the perimeter of the side members and base member of the pipe.

In all embodiments of the present invention, the two-segment insulator is easily and quickly applied to the pipe. Moreover, the insulator is maintained in position around the pipe without the need for other securing devices such as welded wire mesh, welded studs and the like.

It is therefore an object of the present invention to provide an insulator which can easily and quickly be applied in place around a pipe.

A further object of the present invention is to provide two-piece, interlocking insulator which is maintained in place around a pipe without any other additional support means such as welded studs and welded wire mesh.

An even further object of the present invention is to provide a two-piece, interlocking insulator which, when applied to the pipe, reduces the deleterious effects of vibrations on the insulator, which vibrations are transmitted through the pipe during furnace operations.

Yet another object of the present invention is to provide a two-segment interlocking refractory suitable for covering a pair of pipes therein.

These and other objects of the present invention will become even more apparent when read in light of the specification, drawings and claims appended hereto.

BRIEF DESCRIPTION OF THE DRAWINGS

FIG. 2 is a partially exploded perspective view of the novel insulator as applied around the pipe and having a thermal blanket between the pipe and the insulator.

FIG. 4 is a cross-sectional elevational view of the novel insulator in place around a truncated triangular pipe having a pair of shoulders extending from either side of the apex member.

FIG. 5 is a view in perspective of another embodiment of the present invention containing a pair of contiguous truncated triangular pipes therein and having a thermal blanket located between the pipes and the insulator.

DESCRIPTION OF THE PREFERRED EMBODIMENT

Figure 1:
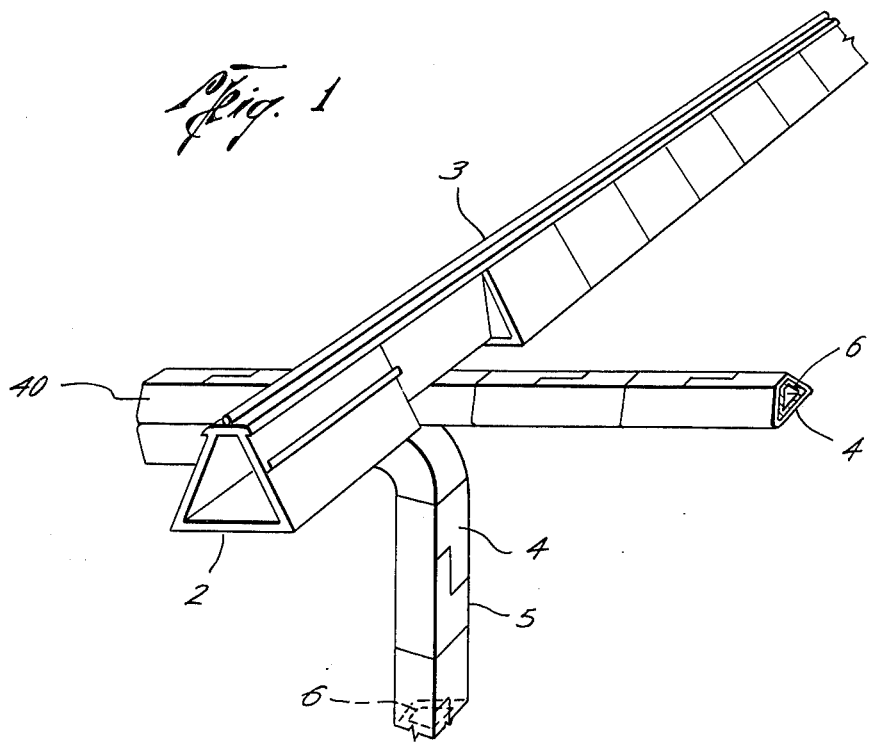
FIG. 1 is a perspective view of a portion of the pipe system in a metallurgical reheat furnace showing a skid pipe, a cross pipe and a portion of a vertical pipe or hairpin pipe which deviates to become longitudinally aligned with and contiguous to the cross pipe.

A portion of a metallurgical reheat furnace is shown in FIG. 1 including a skid pipe 2 and a pipe 6 utilized as a horizontal cross pipe and also used as a substantial portion of the insulated hairpin pipe 5 to support the remaining pipe structure. The pipe 6, which is surrounded by the new interlocking, self-supporting insulator 4 is also shown in combination with the pipe in FIGS. 2 and 3. It is understood by those skilled in the art that the skid pipe 2, upon removal of the skid rail 3, can also be utilized as a cross pipe or a hairpin pipe in place of the pipe 6 and can be covered with the new interlocking, self-supporting refractory as shown in FIG. 4.

Where the cross pipe and the hairpin pipe are closely aligned and in proximity to one another, another embodiment of the insulator invention is shown in FIG. 1 with the numerical designation 40. The double pipe insulator shape 40 is further shown in FIG. 5 and can include a blanket 46 which can also be found in the embodiments in FIG. 4 by the designation 38 and FIGS. 2 and 3 by the designation 10. These thermal blankets 46, 38 and 10 are most suitably a ceramic fiber blanket which is very pliable and not only acts as an additional thermal barrier, but further operates as a shock absorber or damper to minimize the effects of flexion of the pipe and vibrations transmitted through the pipe upon the various embodiments of the new insulator.

Figure 3:
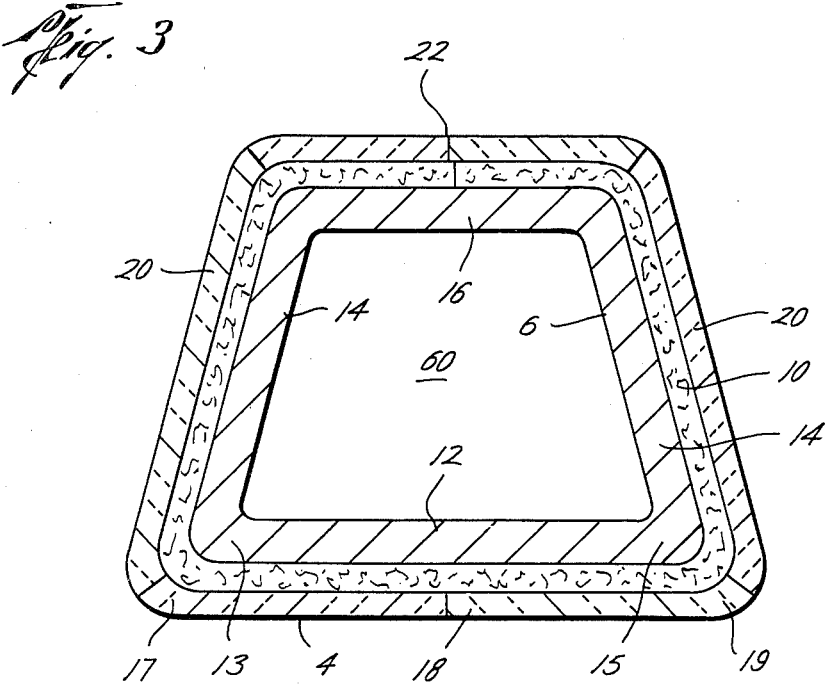
FIG. 3 is a cross sectional view taken along lines 2—2 of FIG. 2 showing the insulator in place around the thermal blanket which surrounds the truncated triangular pipe.

Because a new truncated triangular pipe 6 as shown in FIGS. 2 and 3 is being introduced to the steel industry, a novel insulator is necessitated, which insulator is an effective thermal barrier, easily and quickly applied around the pipe, is self-supporting around the pipe without the use of additional support means such as wire mesh or metal studs welded onto the pipe itself and which insulator, by virtue of its unique interlocking truncated triangular shape, remains on the pipe more effectively than conventional insulators thereby significantly reducing the energy loss in the furnace due to improper insulation of the pipe network.

As shown in FIGS. 2 and 3, the pipe with which the new insulator shall be used is a truncated triangular pipe having a base member 12 having two ends 13 and 15, a pair of side members 14 which convergingly extend from the ends of the base member 12 and integrally join and terminate with an apex member 16. A passageway 60 is thus defined through which a coolant such as water is flowed. When the insulator 4 is in place around the pipe 6, as shown, in FIG. 3, the insulator includes a base unit 18 having first and second ends 17 and 19 respectively, and a pair of side walls 20 which convergingly extend from the first and second ends of the base unit. The side walls 20 terminate and join in apex unit 22 so that a truncated triangular insulator 4 results which conformingly surrounds the perimeter of the enclosed pipe 6. If the insulator 4 closely surrounds the pipe 6 without a blanket 10 therebetween, either a heavy, dense or a light-weight fiber refractory material for the insulator 4 will suffice. If, however, a blanket 10 is located between the insulator 4 and the pipe 6, the insulator is preferably composed of a light weight, ceramic fiber material which reduces the compression on and chafing of the blanket 10 between the insulator 4 and the pipe 6. The blanket 10 as shown in FIG. 3 serves as an additional thermal barrier and also tends to damp the effects of the vibrations in the pipe on the insulator 4 as the metal shapes are pushed along the skid pipe.

Figure 6:
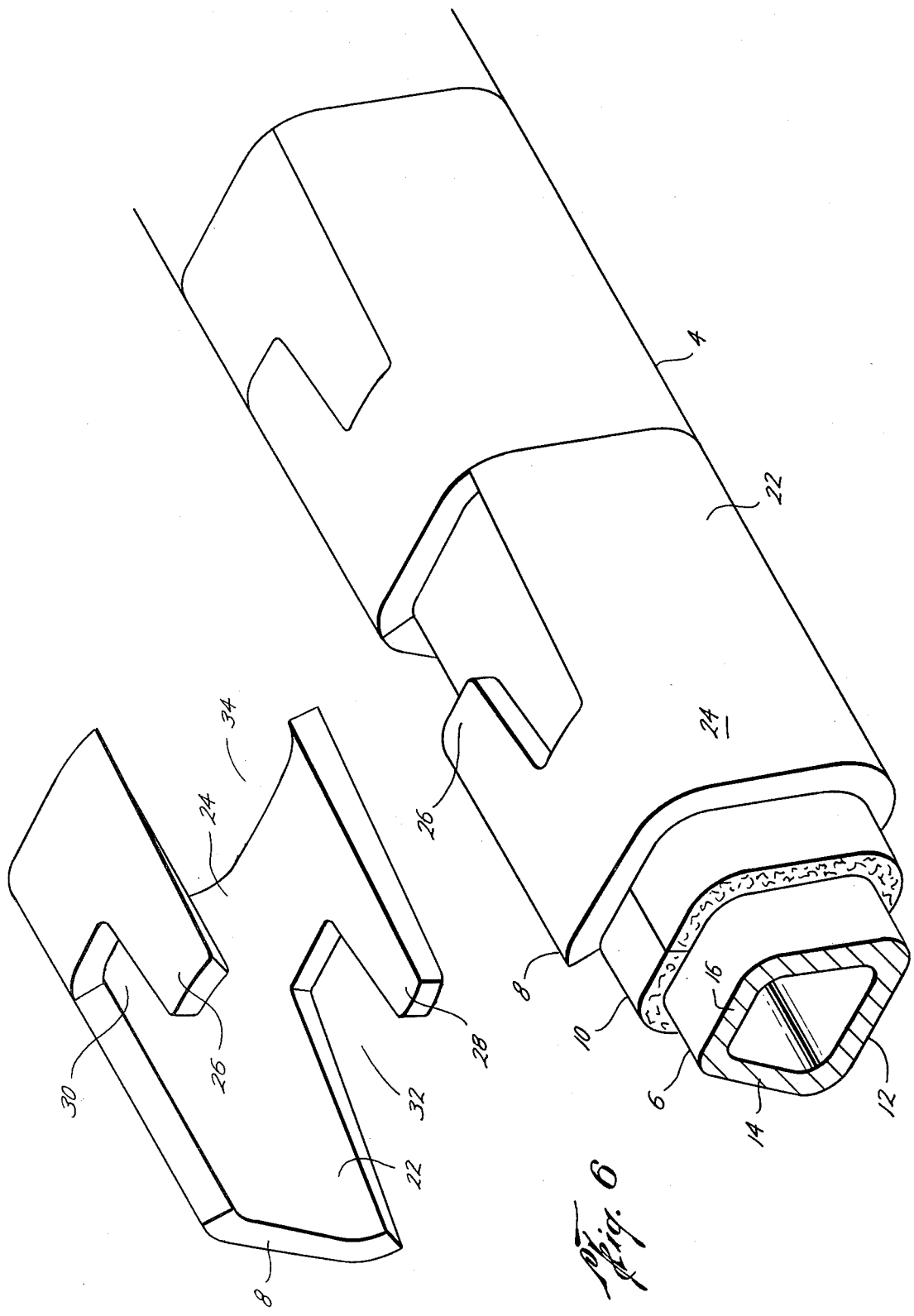
FIG. 6 is a partially exploded perspective view of the insulator with an enhanced view of the conformingly tapered body and void of each insulator segment.

As shown in FIG. 2, the insulator includes two identical segments 8. Each segment has a primary member 24 which forms adjoining portions of the apex unit, base unit and one side wall of the insulator. A body member 22 longitudinally extends from a portion of the primary member 24 to form substantially one side wall of the insulator segment. A pair of arms 26 and 28 also extend longitudinally from portions of the primary member 24 to form a portion of the apex unit and base unit respectively. The arms 26 and 28 are further circumferentially spaced apart from the body member 22 by the recesses 30 and 32 respectively. The arms 26 and 28 are circumferentially spaced apart from themselves by a void 34 which substantially conforms to the body member 22. The void 34 should be sufficiently large in circumferential distance to permit the pipe 6 and, if appropriate the blanket 10, to pass therethrough as the segment is longitudinally aligned around a portion of the pipe 6. When each segment 8 is conformingly aligned around the pipe 6, and the segments are longitudinally urged together to form an insulator comprising two conforming segments, the insulator effectively surrounds the perimeter of the pipe 6 and, if appropriate, the blanket 10. Those skilled in the art will realize that the body 22 and the void 34 can be conformingly tapered longitudinally as shown in FIG. 6 so that as the two segments 8 are urged together, a more intimate fit between the two segments 8 is obtained. The arms 26 and 28 can similarly be tapered.

For those segments of the furnace in which a pair of the truncated triangular pipes 6 are longitudinally aligned such that their base members 12 are contiguous or proximate to one another, another embodiment of the present invention as shown in FIG. 5 is required in order to insulate the pair of pipes. As shown in FIG. 5, the embodiment of the insulator 40 again includes two identical segments. When in place around the pair of pipes, the insulator includes a pair of apex units 48 which are spaced apart and substantially aligned with one another. Each apex unit 48 has a pair of side walls 42 which equidistantly and divergingly extend from the apex unit 48 toward the other pair of divergingly extending side walls 42. The side walls 42 extending from one apex unit 48 meet and integrally adjoin the other corresponding pair of side walls 42 of the other apex unit 48 thereby forming a pair of double-angle side walls. The insulator in place therefore has six sides.

Each segment of the double pipe insulator as shown in FIG. 5 includes a double-angle side wall 44, a pair of arms 62 (partially shown) which are partially and integrally secured to the portion of the double-angle wall 44 and are further partially circumferentially spaced apart from either side of the double-angle side wall 44 by a recess 64 as partially shown in FIG. 5. The arms 62 are circumferentially spaced apart from one another by a void (not shown) suitable for conformingly receiving a double-angle side wall 44 of another segment. The void (not shown) should be sufficiently great in circumference to receive the pair of longitudinally aligned pipes 6 and, if appropriate, a surrounding thermal blanket 46. Again, if the embodiment as shown in FIG. 5 is a light-weight ceramic fiber material, the blanket 46 can be included between the pipes 6 and the insulator 40 in order to increase the thermal barrier characteristics around the pipes and to damp the effects of the vibrations in the pipes on the refractory 40. Hence, when the two segments are conformingly aligned around the pair of pipes, and are longitudinally urged into conformation with one another, an insulator 40 as shown in FIG. 5 is formed.

In certain areas of the reheat furnace where the effects of metal slag are more pronounced, it may be desirable to have an insulator which must be composed of a dense, slag-resistant refractory material, such as prefired refractory brick. In such case, the heavy, prefired refractory insulator can be used in combination with a truncated triangular pipe 2 which substantially conforms to the pipe 6 but further includes a pair of shoulders 36 which extend oppositely one another from the apex member 16. The two-piece, interlocking insulator therefore abuts and is primarily supported by the apex member 16 and shoulders 36 of the pipe. A blanket 38 which substantially covers the perimeter of the side members 14 and base member 12, is disposed between the pipe 2 and the surrounding insulator 4.

All the embodiments of the present invention are quickly and easily applied to the pipe or pipes to be covered in the furnace. Each segment of the insulator is applied around the pipe or pipes so that the pipe or pipes are received through the appropriate void in the insulator. When the segments of the insulator are conformingly aligned with one another around the pipe or pipes, and when the segments of the insulator are conformingly and longitudinally urged together, an insulator is formed which covers the pipe or pipes therein. The resulting insulator is retained around the pipe or pipes by its unique interlocking function and without the use of any other mechanical support device. The resulting combinations of the insulators and the truncated triangular pipe or pipes permits the existing pipe network in a metallurgical reheat furnace to be replaced with a pipe network having fewer pipes which are spaced farther apart because of the inherent strength characteristics of the pipe design, and which pipes are quickly, economically and more lastingly insulated when used in combination with the novel insulator design described and claimed herein.

It is clear, therefore, that the present invention meets the objectives heretofor stated and other objectives inherent in the description of the preferred embodiments. It is understood that other reasonable equivalents, modifications, combinations and reversal of parts fall well within the letter and spirit of the present invention.

What is claimed is:

1. An interlocking, two-segment insulator for covering a pipe, the pipe having a base member, a pair of converging side members terminating in an apex member and whose perimeter defines a truncated triangular shape, the insulator comprising a base unit having first and second ends, a pair of side walls convergingly extending from the first and second ends of the base unit, the side walls terminating in and joining with an apex unit which connects the spaced apart side walls and each segment of the insulator includes a primary member forming a portion of one side wall and the apex and base units and circumferentially opened by a void corresponding to the remaining side wall of the insulator, a body extending longitudinally from the primary member, a pair of arms extending longitudinally from the primary member less than the body, the arms located circumferentially on either side of the body and spaced apart from the body by a pair of corresponding recesses, said arms themselves spaced apart by the void when properly aligned around the pipe are axially urged together, the void of each segment receives the body of the other segment and each pair of recesses receives the corresponding arms of the other segment thereby forming a truncated triangular, two-piece insulator which is maintained in place around the pipe without any other support means.

2. The device of claim 1 wherein the body and the void of each segment are conformingly tapered.

3. The device of claim 1 wherein the void is circumferentially sufficient to receive one side member and a portion of the base and apex members of the pipe therethrough.

4. A two-segment ceramic fiber insulator for insulating a pair of truncated triangular pipes therein, the truncated triangular pipes each having a base member, a pair of converging side members and an apex member which is circumferentially less than the base member, the pipes positioned so that the perimeter of the base members are contiguous to one another, the insulator comprising:
  a pair of apex units, each apex unit having a pair of side walls equally and divergingly extending therefrom and toward the other pair of divergingly extending side walls,
  each diverging side wall integrally adjoining the corresponding diverging side wall of the other apex unit to form an insulator having a pair of double-angle side walls terminating in and connected by a pair of apex units,
  each segment of the two-segment insulator including one of the double-angle side walls, a pair of arms forming a part of the respective apex units, the arms being partially integral with the double-angle side wall and partially circumferentially spaced apart therefrom by corresponding recesses,
  the arms circumferentially spaced apart from one another by a void conforming to the remaining double-angle side wall whereby when the two segments are conformingly aligned with one another around the pair of truncated triangular pipes, and when the segments are longitudinally and conformingly urged together, a two-segment insulator results, which insulator is maintained in position around the pipes without any other means of support.

5. The combination of a truncated triangular pipe having a base member with two ends, a pair of converging side members extending from either end of the base member, said side members terminating in and integrally secured to an apex member thereby forming a truncated triangular pipe having a passageway therethrough suitable for communicating a fluid, in combination with a two-piece truncated triangular insulator, which insulator includes a base unit having two ends, a pair of converging side walls extending from either end of the base unit and integrally terminating with an apex unit to form a truncated triangular, two-piece insulator conformingly surrounding the perimeter of the pipe, each segment of the insulator further including a primary member circumferentially including a portion of the base unit, apex unit and joining side wall,
  a body extending longitudinally from a portion of the primary member to form one of the side walls on the insulator,
  a pair of arms extending longitudinally from the base member to form portions of the apex unit and base unit, said projecting arms being partially circumferentially spaced from either side of the body by corresponding recesses and further spaced apart from one another by a void corresponding to the remaining side wall whereby as body segments of the insulator are longitudinally aligned around the pipe and are conformingly aligned with one another, the two segments are longitudinally and conformingly urged together to form a two-piece truncated triangular insulator around a truncated triangular pipe.

6. The device of claim 5 wherein a ceramic fiber blanket is disposed between the outer perimeter of the pipe and the surrounding insulator.

7. A combination of a pair of truncated triangular pipes each having a base member, a pair of converging side members terminating with and integral to an apex member, which pipes are positioned so that the base members are substantially aligned with and in close proximity to one another and an insulator conformingly surrounding the truncated triangular pipes, the insulator including a pair of apex units each having two ends, each apex unit having a pair of side walls divergingly extending from the ends of each apex unit toward the other pair of diverging extending side walls, each diverging side wall integrally adjoining the corresponding diverging side walls of the other apex unit to form an insulator having a pair of double-angle side walls terminating in and connected by a pair of apex units, each segment of the two-segment insulator including one of the double-angle side walls, a pair of longitudinally extending arms forming a part of the respective apex units, the arms being partially integral with the double-angle side wall and partially circumferentially spaced apart therefrom by corresponding recesses, and the arms circumferentially spaced apart from one another by a void conforming to the remaining double-angle side wall whereby when the two segments are conformingly aligned with one another around the pair of truncated triangular pipes, and are longitudinally and conformingly urged together, the pipes are enclosed within a two-segment insulator which is maintained in position around the pipes without any other means of support.

8. The device of claim 7 wherein a ceramic fiber blanket is disposed between the insulator and the pair of pipes.

9. An insulated pipe comprising a truncated triangular pipe having a base member with two ends, a pair of converging side members extending from the ends of the base member and integrally terminating with an apex member having a pair of shoulders projecting outwardly therefrom, each shoulder having a lower lip substantially misaligned from the vertical, a thermal blanket insulator extending from the lower lip of one shoulder around the perimeter of the base member and the side members, said blanket terminating in proximity to the lower lip of the other shoulder, and a two-piece truncated triangular insulator in intimate contact with the apex member of the pipe and the thermal blanket, the two-piece insulator including a base unit having two ends, a pair of side walls convergingly extending from the ends of the base unit and integrally terminating in an apex unit, each segment of the insulator further including a primary member traversing the apex member of the pipe and the thermal blanket around one side member and the base member of the pipe, a body longitudinally projecting from the primary member, a pair of arms longitudinally projecting from the primary member to form a part of the apex and base units of the insulator, the projecting arms being circumferentially spaced apart from the body by corresponding recesses, the arms further being circumferentially spaced apart from one another by a void whereby when the two segments are conformingly aligned with one another around the pipe and thermal blanket and are longitudinally and conformingly urged together, an insulated pipe results, which insulator is maintained in position around the pipe without any other means of support.

* * * * *

UNITED STATES PATENT OFFICE
CERTIFICATE OF CORRECTION

Patent No. 4,275,771  Dated  June 30, 1981

Inventor(s)  Frank Campbell, Jr.

It is certified that error appears in the above-identified patent and that said Letters Patent are hereby corrected as shown below:

In Claim 7 (Column 8, line 44) "walls" should read --wall--.

Signed and Sealed this

Fifteenth Day of September 1981

[SEAL]

Attest:

GERALD J. MOSSINGHOFF

Attesting Officer  Commissioner of Patents and Trademarks